United States Patent [19]

Aida et al.

[11] Patent Number: 5,236,300

[45] Date of Patent: Aug. 17, 1993

[54] STACKING AND FORWARDING APPARATUS

[75] Inventors: Satoru Aida, Sanjo; Hideo Soyama, Tsukigata; Mitsuaki Kawabata; Masashi Yokoyama, both of Tokyo, Japan

[73] Assignees: Sanjo Machine Works, Ltd., Niigata; Japan Tobacco Inc., Tokyo, both of Japan

[21] Appl. No.: 874,225

[22] Filed: Apr. 27, 1992

Related U.S. Application Data

[63] Continuation of Ser. No. 539,181, Jun. 12, 1990, abandoned.

[30] Foreign Application Priority Data

Jun. 17, 1989 [JP] Japan .................. 1-155185

[51] Int. Cl.$^5$ .............................................. B65G 57/30
[52] U.S. Cl. .................. 414/795.1; 198/625; 414/790.3
[58] Field of Search .............. 74/567; 198/625; 414/794.2, 794.8, 794.9, 795, 795.1, 795.2, 795.3, 797.7, 790.3

[56] References Cited

U.S. PATENT DOCUMENTS

| 2,954,133 | 9/1960 | Geisow | 414/795 |
|---|---|---|---|
| 2,988,236 | 6/1961 | Shields | 414/794.9 X |
| 3,250,376 | 5/1966 | Griner et al. | 198/35 |
| 4,108,319 | 8/1978 | Kacirek et al. | 414/795.1 |
| 4,314,785 | 2/1982 | LaFleur, Jr. et al. | 414/795.1 X |
| 4,378,938 | 4/1983 | Staniszewski | 414/795.1 X |
| 4,955,783 | 9/1990 | Grazia | 414/795 |

FOREIGN PATENT DOCUMENTS

| 0137201 | 4/1985 | European Pat. Off. |  |
|---|---|---|---|
| 0159085 | 10/1985 | European Pat. Off. |  |
| 168548 | 1/1986 | European Pat. Off. |  |
| 2206437 | 8/1973 | Fed. Rep. of Germany |  |
| 2502129 | 7/1976 | Fed. Rep. of Germany |  |
| 126035 | 6/1987 | Japan | 414/795.3 |
| 63-17741 | 1/1988 | Japan | 414/797.7 |
| 63-53089 | 10/1988 | Japan |  |
| 931918 | 7/1963 | United Kingdom |  |

*Primary Examiner*—Michael S. Huppert
*Assistant Examiner*—Janice Krizek
*Attorney, Agent, or Firm*—Nixon & Vanderhye

[57] ABSTRACT

In a stacking and forwarding apparatus, an array of work is continuously transported or rails by belts and a preceeding one of works is located and stopped in a receiving space defined by stoppers. The preceeding one of works is lifted by three guide rails which are located at left and right sides and front side of the work. Thus, a next work is received in the receiving space under the preceeding work and also lifted by the rollers. The pair of stacked works is pushed outside of the apparatus.

9 Claims, 8 Drawing Sheets

STACKING AND FORWARDING APPARATUS

This is a continuation of U.S. patent application Ser. No. 07/539,181, filed Jun. 12, 1990, now abandoned.

BACKGROUND OF THE INVENTION

1. Field of the Invention

This invention relates to a stacking and forwarding apparatus for stacking works supplied one after another and forwarding them, and more particularly, to a packing machine adapted to pack works, such as cigarette packs, into one box, such that the works are arranged in two rows, stacked one on the other, each consisting of 5 works.

2. Description of the Related Art

A conventional apparatus of this kind is disclosed in Published Unexamined Japanese Patent Application No. 62-126035. In this apparatus, two parallel belts 51 transfer works W, such as cigarette packs, one by one into a divided section 52, as shown in FIGS. 1 through 3. The section 52 is provided with a lower receiving portion 52a and an upper receiving portion 52b. After the first work W is transported into the lower receiving portion 52a, as shown in FIG. 1, the divided section 52 moves downward, whereby the second work W is guided into the upper receiving portion 52b, and simultaneously, the first work is pushed from the lower receiving portion 52b into a stacking section 54 by a pushing member 53a, as shown in FIG. 2. Then, as is shown in FIG. 3, the divided section 52 and the stacking section 54 move upward, whereby the second work is pushed from the upper receiving portion 52b by a pushing member 53b located above the pushing member 53a, onto the first work located on the stacking section 54, and at the same time the third work W is received in the lower receiving portion 52a. The first and second works W stacked on the stacking member 54 are pushed out by a send-out member 55, as shown in FIG. 1. Thus, the works W supplied one by one on a continuous basis are forwarded in a stacked state.

In the conventional apparatus, to stack the works, the divided section 52 is moved up and down, and the pushing member 53a and 53b are moved back and forth. Consequently, the stacking operation cannot be performed at high speed. In particular, the reciprocation of the divided section 52 makes high-speed stacking difficult.

SUMMARY OF THE INVENTION

An object of the invention is to provide an apparatus which can stack successively supplied works, and forward the stacked works, at high speed.

According to the invention, there is provided an apparatus comprising:

transporting means for transporting works one after another in a first direction on a continuous basis;

interrupting means for interrupting the transport of the works in the first direction;

guide means for guiding any work from the interrupting means, in a second direction different from the first direction, and allowing the next work to be transported into said interrupting means, thereby stacking the guided work on the received work, and guiding the stacked works in the second direction; and forwarding means for forwarding at least two stacked works.

DETAILED DESCRIPTION OF THE PREFERRED EMBODIMENTS

Figure 1:
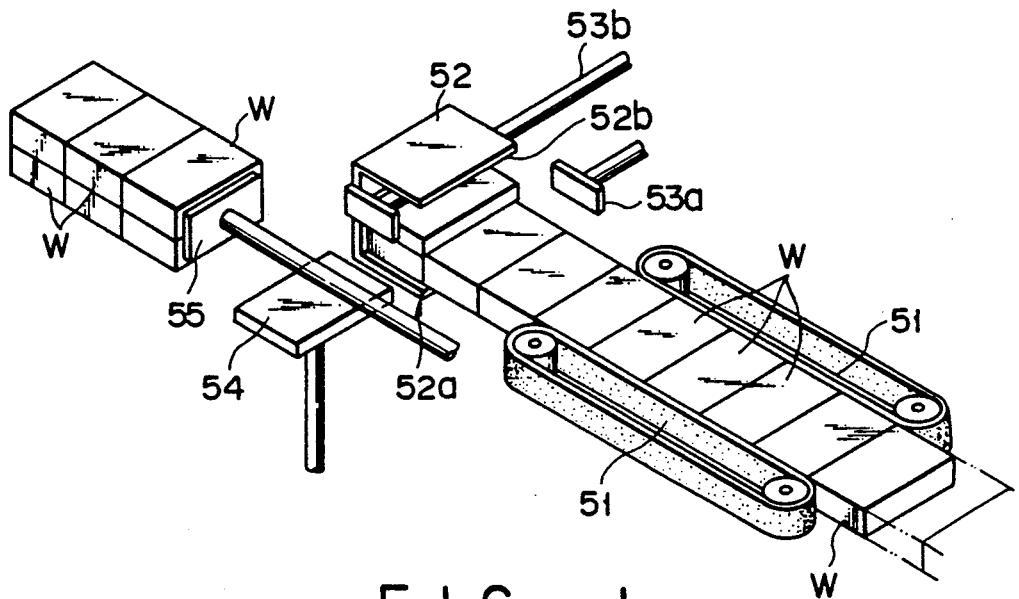
FIGS. 1 to 3 are perspective views of a conventional stacking and forwarding apparatus, useful in explaining the operation thereof to stack and transport works supplied on a continuous basis.
Figure 2:
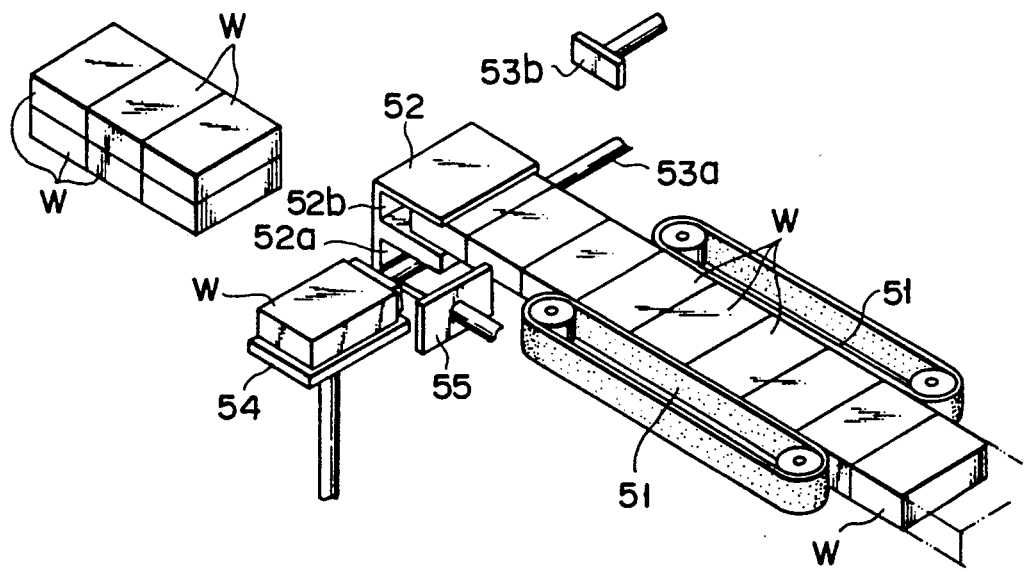
Figure 3:
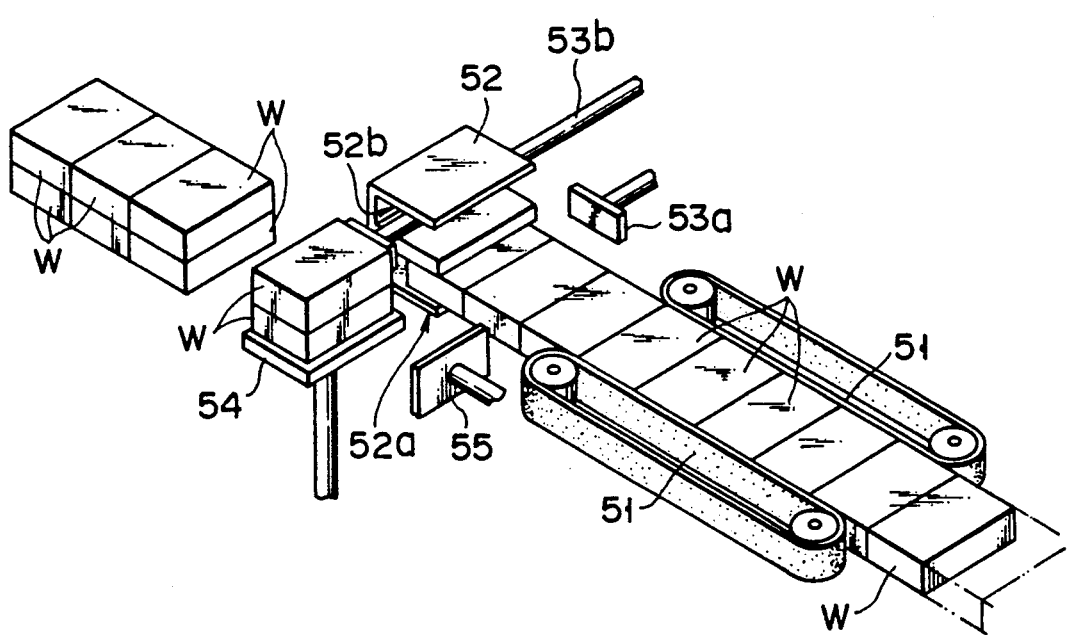
Figure 4:
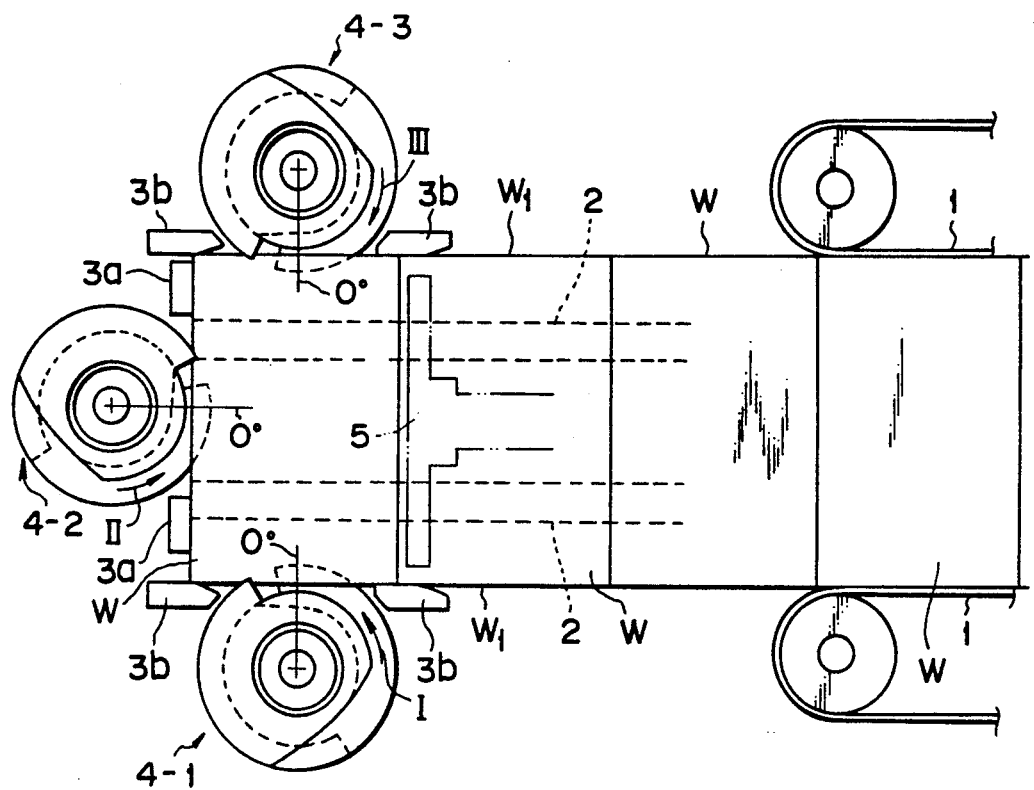
FIG. 4 is a schematic plan view of a stacking and forwarding apparatus of the invention for stacking and forwarding works supplied on a continuous basis.

FIGS. 4 to 9 show a packing apparatus according to one embodiment of the invention, which packs works or articles, for example, cigarette packs, into boxes, such that the works are arranged, in each box, in two rows stacked one on the other, each consisting of 5 works. In FIG. 4, the symbol W designates a work or article, i.e. a cigarette pack in the embodiment. The works or articles W are continuously transported on a rail 2 from a cigarette-pack manufacturing-device, with the opposite shorter sides of the pack held between two parallel belts 1. Thus, the works W are supplied, on a continuous basis, to a receiving section 3, which comprises stoppers 3a and 3a to be brought into contact with the front surface of the work W, and guide members 3b, 3b, 3b and 3b to be brought into contact with the opposite shorter sides of the work W. Thus, the work W is placed by the stoppers 3a and 3a and guide members 3b, 3b, 3b and 3b in a proper location wherein the work is capable of being lifted.

Figure 12:
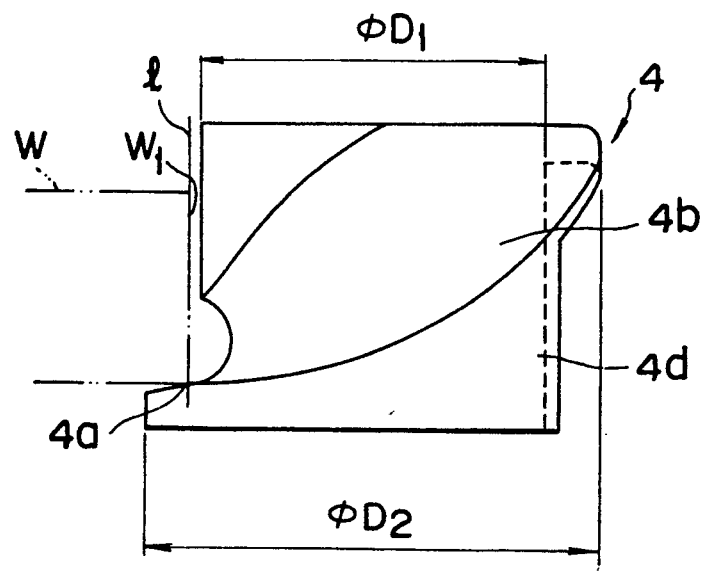
FIG. 12 is a side view of the roller shown in FIG. 10.
Figure 13:
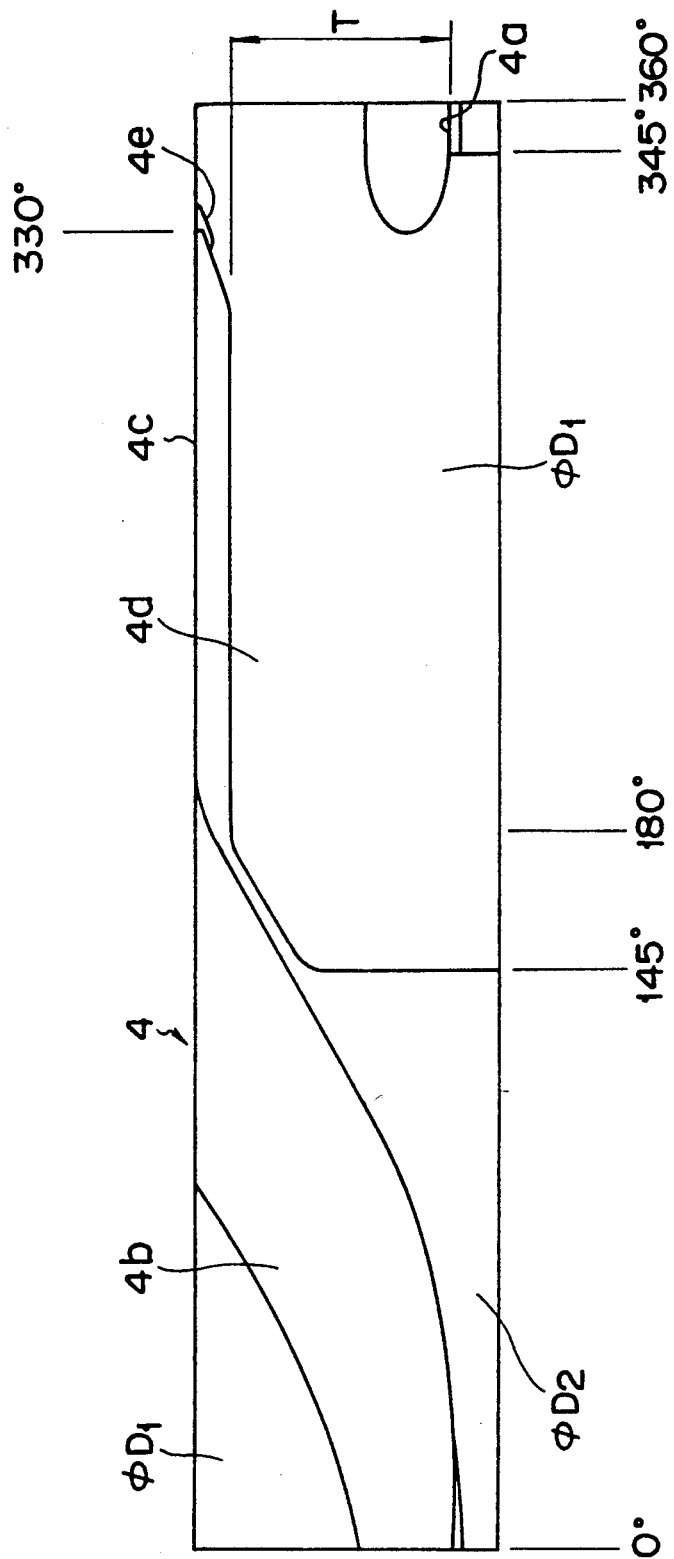
FIG. 13 is a development of the peripheral surface of the roller shown in FIG. 10.

As is shown in FIGS. 10 to 13, stacking rollers 4-1, 4-2 and 4-3 are arranged respectively opposed to the front side and opposite shorter sides of the work W, and can rotate in synchronism with each other in the directions indicated by the arrows I, II and III shown in FIG. 4. More specifically, the first and second rollers 4-1 and 4-2 have the same shape, and can rotate in the same direction I and II, while the third roller 4-3 has a shape symmetrical to that of the rollers 4-1 and 4-2, and can rotate in the opposite direction. As is shown in FIGS. 10-13, each roller 4 comprises a base portion defined by a basic diameter D1, and a peripheral portion obtained by removing the base portion from the entire body defined by a reference diameter D2, and is arranged such that the base portion does not contact the work W, and the peripheral portion can contact the bottom surface of the work W. The peripheral portion is provided with a stage 4a, a guide surface 4b, a stacking portion 4c having an upper surface and a lower surface, and a slanting surface 4e, while the base portion is provided with a relief surface 4d. The stage 4a is formed over the rotational angle from 345° (−15°) to 0° (360°), and has a level equal to or slightly lower than the bottom level of the work W, which is defined by the height of the rail 2, shown in FIG. 10. As is shown in FIG. 12, the guide surface 4b is formed spiral and like a groove (i.e., as a partial screw thread) over the rotational angle from 0° to 180°, and has a height increased from one end to the other end for pushing up the work W. The stacking surface or upper groove surface of the stacking portion 4c is formed over the rotational angle from 180° to 330° (−30°), and has the same height over its entire surface. Over the rotational angle from 145° to 330°, the relief surface 4d is formed, which has a height T larger than the thickness 2W of the work W, and the slanting surface 4e is formed under the stacking portion 4c, for preventing the interference between the upper surface of the work W and the lower surface of the stacking portion 4c.

A pushing rod 5 for pushing the works W is arranged above the works W transported on the rail 2 on a continuous basis, and is reciprocated by a cam mechanism 10 in synchronism with the rotation of the roller 4.

Figure 7:
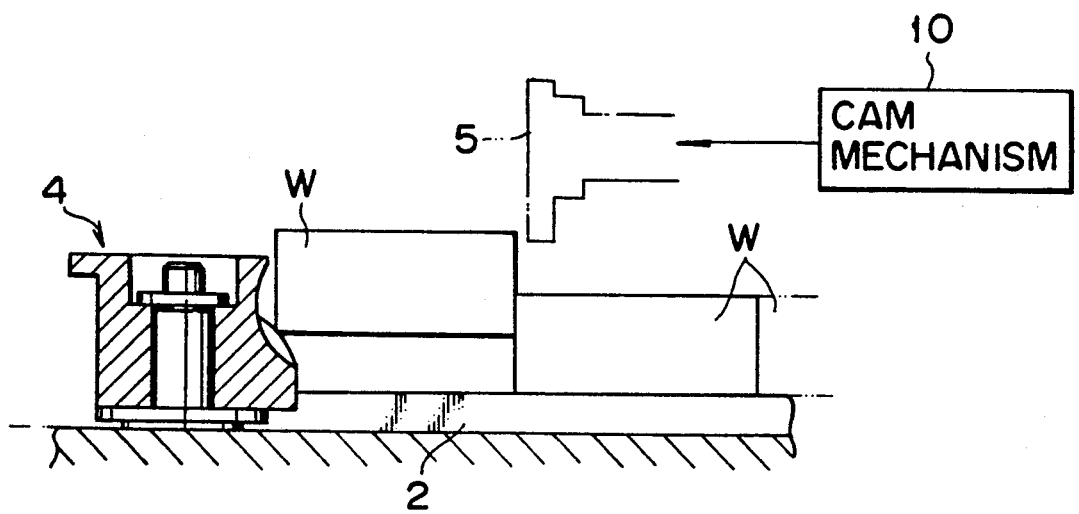
FIG. 7 is a sectional side view of the apparatus shown in FIG. 6.

When the work W, transported on the rail 2 with the opposite shorter sides held between the belts 1, reaches the area where the belts 1 are not provided, it is pushed by the succeeding works W into the receiving section 3, and then slides on the guide surface 4b of the roller 4 in accordance with the rotation of the same, thus being moved upward to be stacked, as is shown in FIG. 7. While the roller rotates through 360°, the work W slides on the upper surface 4c of the roller 4. The speed of the supply of the works W is adjusted to synchronize with the rotation of the roller, such that the next work W is surely received in the receiving section 3, positioned below the first work W, and then has the first work W stacked thereon.

Figure 5:
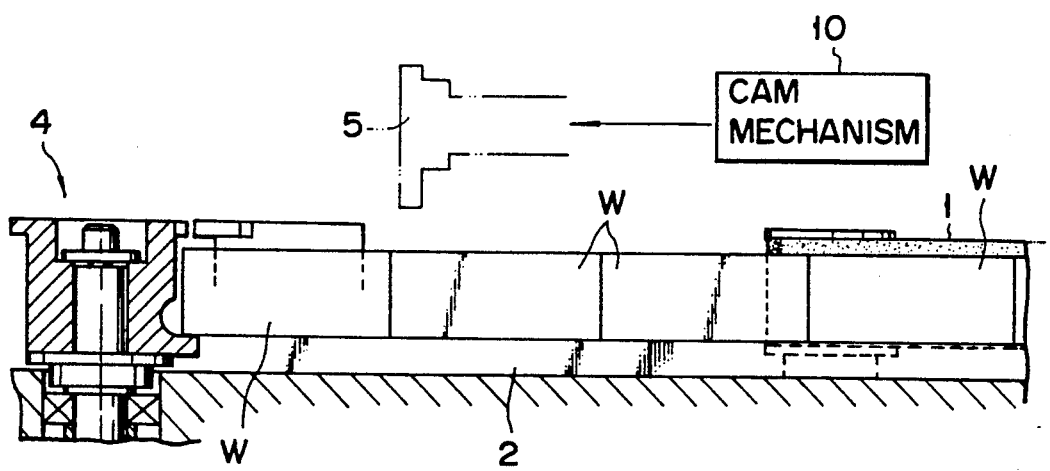
FIG. 5 is a sectional side view of the apparatus shown in FIG. 4.
Figure 6:
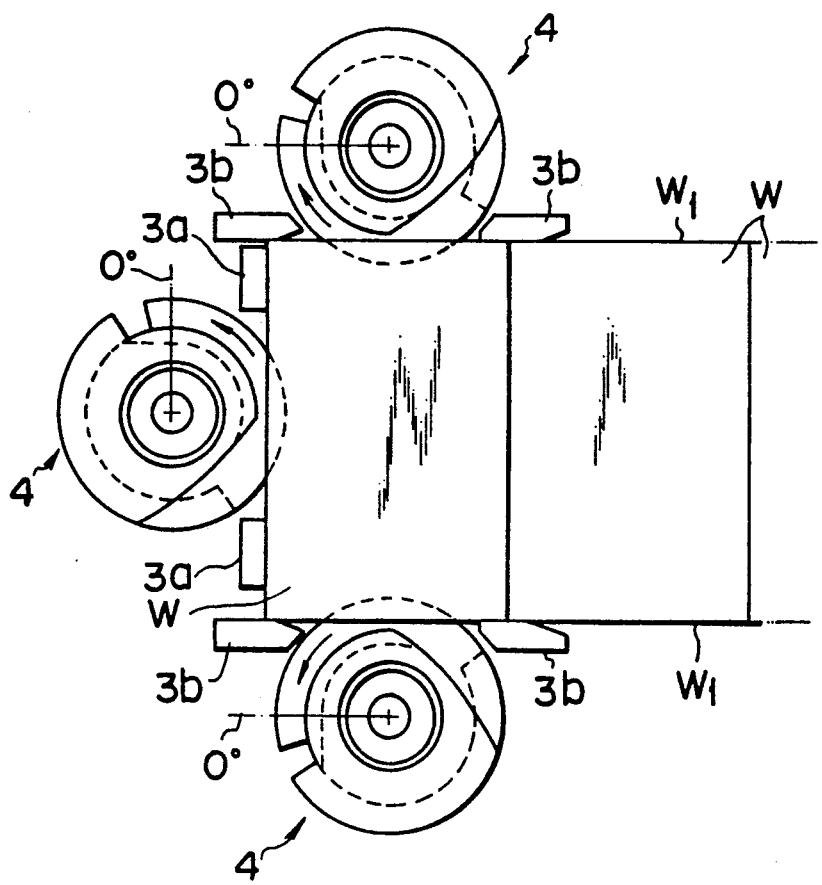
FIG. 6 is a plan view, showing the operation of the apparatus shown in FIG. 4.
Figure 8:
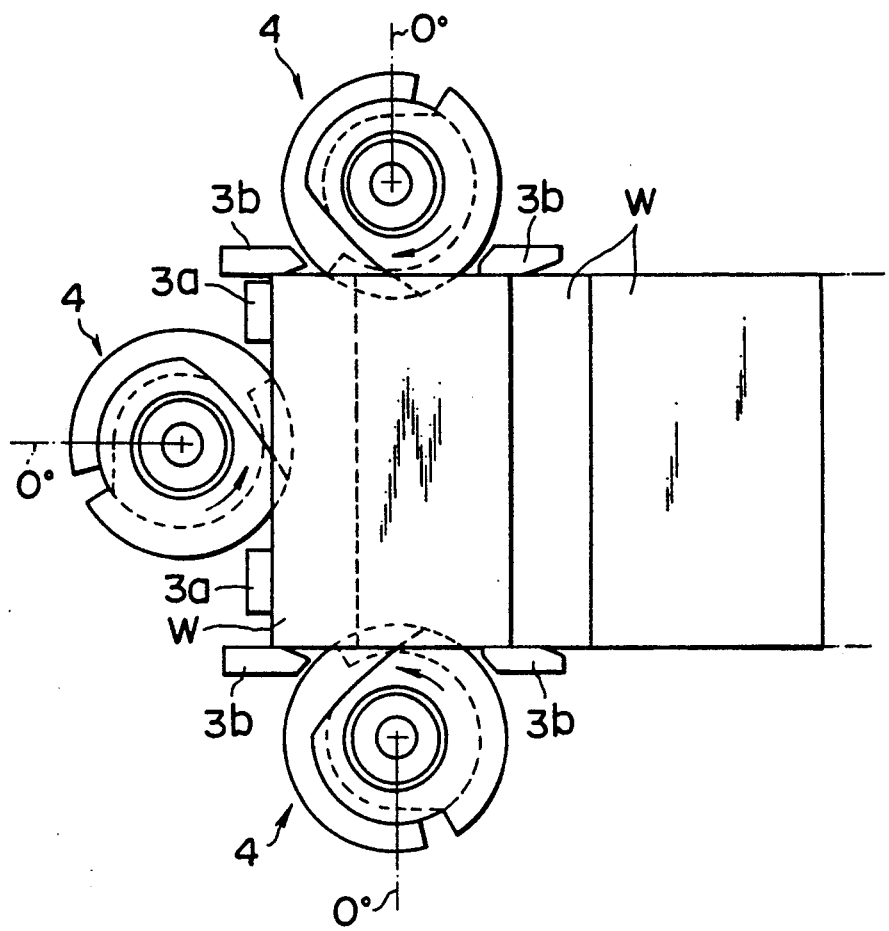
FIG. 8 is a plan view, showing another operation of the apparatus shown in FIG. 4.
Figure 9:
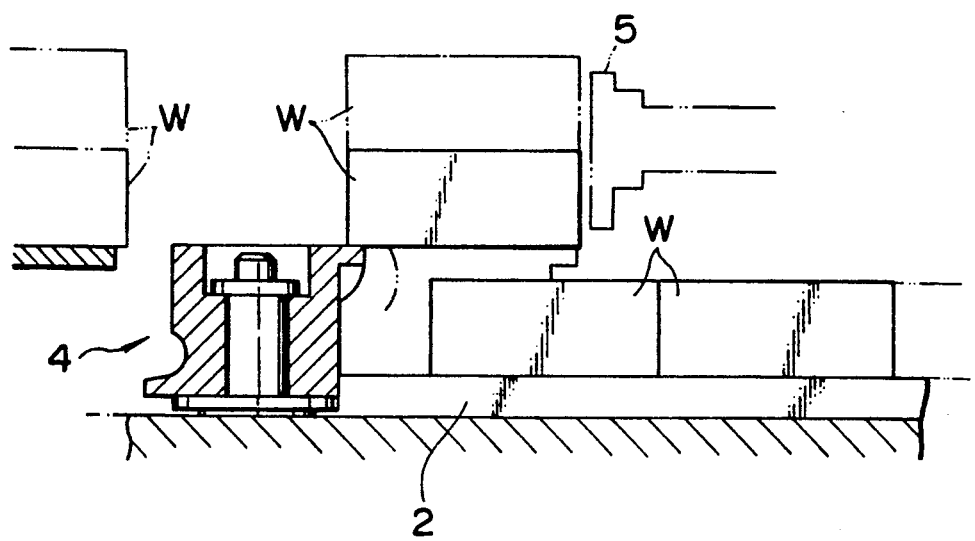
FIG. 9 is a sectional side view of the apparatus shown in FIG. 8.
Figure 10:
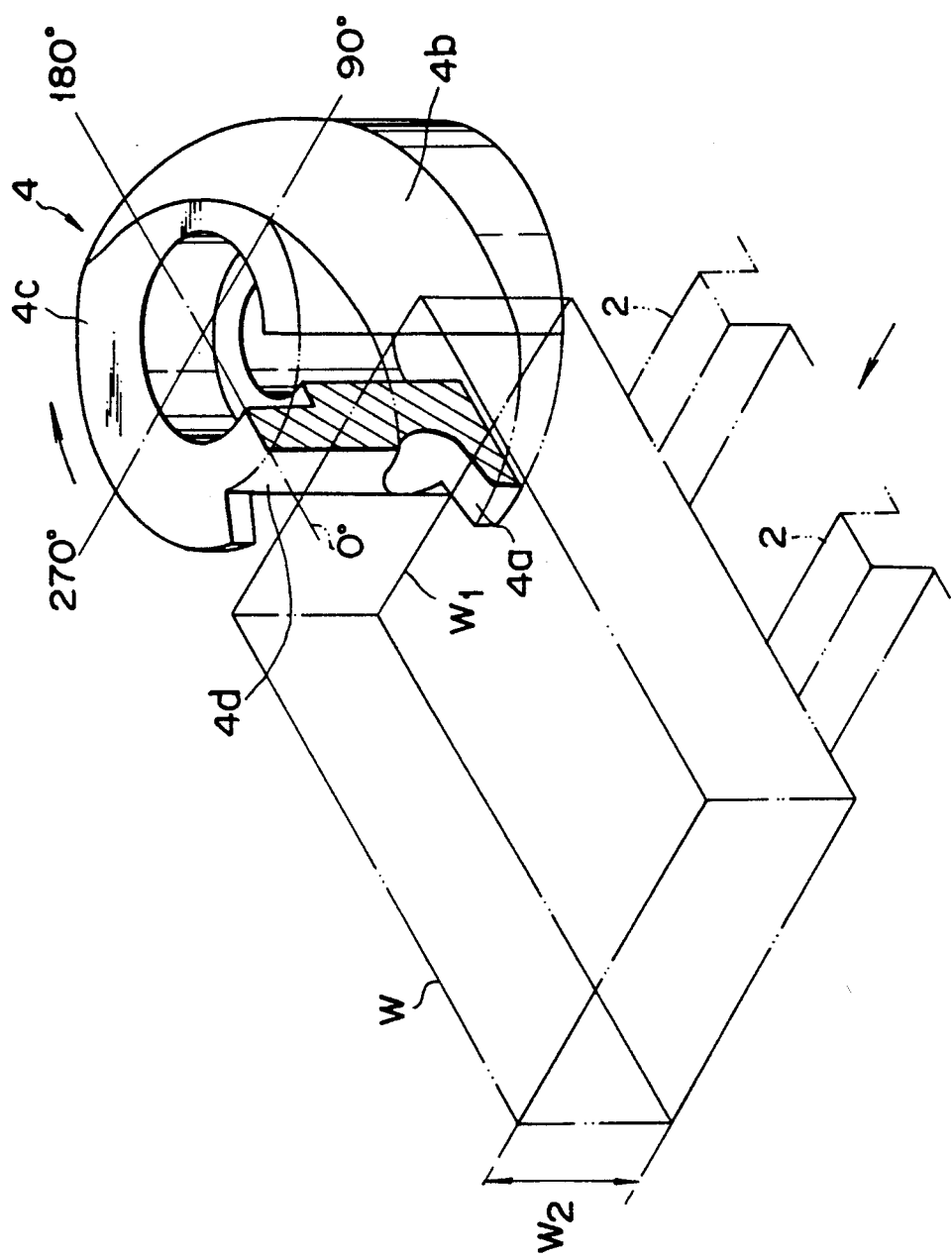
FIG. 10 is a perspective view of a roller for stacking and forwarding works, which is employed in the apparatus shown in FIG. 4.
Figure 11:
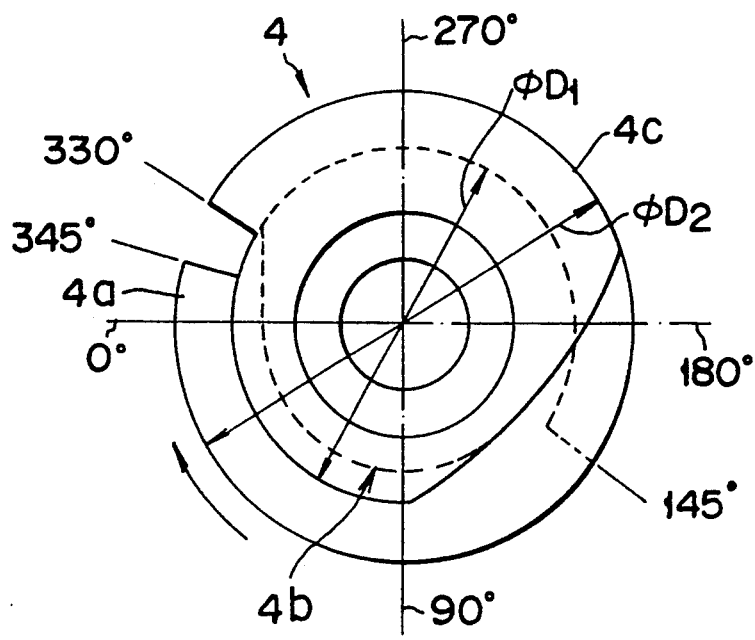
FIG. 11 is a plan view of the roller shown in FIG. 10.

In the above-described stacking and forwarding apparatus, the first work W is received in the receiving section 3 when the rotational angle of the roller 4 is 0 degree, as is shown in FIGS. 4 and 5. In accordance with the rotation of the three rollers 4, the first work W contacts the guide surface 4b of each roller 4, to thereby be moved upward, and is placed on the stacking surface 4c when the rotational angle of the roller reaches 180°. The next work W can enter the receiving section 3 by virtue of the relief surface 4d. When the rotational angle of the roller becomes 0°, the lower surface of the stacking portion 4c is separated from the first work W, and therefore, the first work W falls, by its own weight, onto the second work W already received in the receiving section 3. The second work W also contacts the guide surfaces 4b of the three rollers, and moves upward, with the first work W stacked thereon. As is shown in FIGS. 8 and 9, the stacked works W are placed on the stacking surface 4c at a rotational angle of 270°, and pushed by the pushing rod 5 while the roller moves from 180° to 360°, thus being transported outside the apparatus. The third and fourth works W are stacked and transported in a similar manner to the first and second works W. Thus, two works can be stacked by two revolutions of the roller. Since the stacking and forwarding apparatus employs the rollers 4 which directly transports the works W in a stacking direction and stacks them, the stacking operation can be hastened.

Although in the above embodiment, works W are supplied one by one, and the works of each pair is stacked one on the other, the invention is not limited to this. To stack the works W on n-levels, the apparatus can be modified such that the works are pushed by the pushing rod 5 after the rollers 4 rotate n times. Further, to stack the works, supplied on two-levels, on four-levels, the configuration of the roller 4 can be made such that the works stacked on two-levels can be stacked with further works thereon. In this way, a desired stacking can be performed. Also, in the embodiment, the stacking portion 4c is formed so that it is brought out of contact with the work W at a rotational angle of 0°, and hence the work W falls at this angle, by its own weight, onto the next work W, whereby the two works can move upward together. This structure can be replaced with another. For example, if the stacking portion 4c is lengthened to a maximum, but keeping the upper surface of the work W off the lower surface of the stacking portion 4c, the work W can be prevented from falling down by its weight. Alternatively, the fall of the work due to its own weight can be prevented by applying a frictional force to the opposite sides of the work W when the work W is raised. Moreover, instead of the stacking surface 4c of the roller 4, any similar mechanism can be employed in the apparatus.

Moreover, although a cylindrical roller having a guide surface formed on the periphery thereof is used as the stacking roller 4 in the embodiment, another guiding mechanism can be used, which has opposite ends provided with guide surfaces, respectively, or has another configuration. That is, what is essential is to employ a guide which can directly contact works and transport them in the stacking direction.

As is described above, the present invention employs a stacking roller capable of directly transporting works in a stacking direction and stacking them, which can hasten the stacking operation.

What is claimed is:

1. An apparatus for stacking a forwarding articles, comprising:

transporting means for transporting the articles in a first direction on a continuous basis;

interrupting means for interrupting the transport of the articles in the first direction at a first position;

guide means for, in sequence: guiding a first article from the interrupting means at said first position in a second direction different from the first direction to a second position; for allowing a second article to be transported into said interrupting means; for stacking the first article onto the second article by causing the first article to move from said second position towards said first position; and for guiding the stacked first and second articles in the second direction, wherein said guide means includes first, second and third guide rollers which are rotatable, respectively, about three axes extending substantially parallel to said second direction, said first, second and third guide rollers each having a first guiding surface adapted to be brought into contact with the article received in the interrupting means, said first guiding surface having its height varying in accordance with the rotation of said roller, the article sliding on said first guiding surface and thus being guided in said second direction from said first position to said second position, and further wherein each of said rollers has a second surface for allowing the second article to be transported into the interrupting means, and a third surface for holding the first article in said second position, said second position, said third surface configured to further permit said first article to move from said second position toward said first position for stacking the first article on the second article; and forwarding means for forwarding at least said stacked first and second articles in a direction away from said second position.

2. The apparatus according to claim 1, wherein the transporting means includes a rail mechanism for allowing the articles to slide thereon, and a belt mechanism for moving the articles.

3. The apparatus according to claim 1, wherein the interrupting means includes a plurality of stoppers for contacting the articles.

4. The apparatus according to claim 1, wherein each roller has a cutout portion for placing the first article onto the second article received in the interrupting means.

5. An apparatus for stacking and forwarding articles comprising:
    transporting means for transporting the articles in a first direction, said transporting means including a rail mechanism for allowing said articles to slide thereon, and a belt mechanism for moving said articles, the articles each having forward, side and rear portions relative to said first direction;
    interrupting means for interrupting the transport of the articles in said first direction at a first position; and
    guide means for guiding successive ones of said articles from the interrupting means in a second direction different from said first direction, said guide means including three rollers provided with external guide surface means arranged so that one of said three rollers is in front of said articles relative to the first direction and engages the forward portion of the articles at the first position, and one each of the remaining two rollers is located on either side of said articles and engages the side portions of the articles at the first position, wherein said three rollers are rotatable in synchronism with each other for guiding said articles in said second direction to a second position.

6. The apparatus according to claim 5 wherein each of said articles is supported by said three rollers as each of said articles is guided in said second direction.

7. The apparatus according to claim 5 wherein the interrupting means includes a plurality of stoppers for contacting said articles.

8. The apparatus according to claim 5, wherein each roller has a first guiding surface adapted to be brought into contact with the article received in the interrupting means, said first guiding surface having its height varying in accordance with the rotation of said roller, the article sliding on said first surface and thus being guided in said second direction.

9. The apparatus according to claim 8 wherein said first guiding surface includes a partial screw thread.

* * * * *